(12) United States Patent
Peng

(10) Patent No.: US 8,495,794 B2
(45) Date of Patent: Jul. 30, 2013

(54) ROTATING MODULE AND ELECTRONIC DEVICE USING SAME

(75) Inventor: Liang-Tian Peng, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 3 days.

(21) Appl. No.: 13/331,732

(22) Filed: Dec. 20, 2011

(65) Prior Publication Data
US 2013/0044414 A1   Feb. 21, 2013

(30) Foreign Application Priority Data

Aug. 18, 2011  (CN) .......................... 2011 1 0237590

(51) Int. Cl.
*E05F 1/08* (2006.01)
(52) U.S. Cl.
USPC .................................. 16/286; 16/293; 16/291
(58) Field of Classification Search
USPC ............... 16/286, 290, 280, 293, 333, 72, 73, 16/76, 78, 71; 361/679.08, 679.11, 679.02, 361/679.15, 679.27; 455/90.3, 575.1, 575.3, 455/575.8; 379/433.12, 433.13; 348/373, 348/333.01, 333.06, 794; 49/386, 387
See application file for complete search history.

(56) References Cited

U.S. PATENT DOCUMENTS

| | | | | |
|---|---|---|---|---|
| 3,164,404 A | * | 1/1965 | Arnold | 292/273 |
| 3,344,462 A | * | 10/1967 | Webster | 16/357 |
| 3,608,129 A | * | 9/1971 | Heyer | 16/291 |
| 3,628,371 A | * | 12/1971 | Moore et al. | 73/1.26 |
| 3,643,291 A | * | 2/1972 | Clark | 16/289 |
| 3,950,819 A | * | 4/1976 | Little | 16/290 |
| 5,027,473 A | * | 7/1991 | Hottmann | 16/286 |
| 5,271,652 A | * | 12/1993 | Watanabe et al. | 296/36 |
| 5,488,757 A | * | 2/1996 | Cohen et al. | 16/289 |
| 5,613,644 A | * | 3/1997 | Karlsson | 242/232 |
| 5,931,554 A | * | 8/1999 | Koopman | 312/405 |
| 8,122,568 B2 | * | 2/2012 | Jin et al. | 16/357 |
| 8,352,000 B2 | * | 1/2013 | Kim et al. | 455/575.3 |

* cited by examiner

*Primary Examiner* — Chuck Mah
(74) *Attorney, Agent, or Firm* — Altis Law Group, Inc.

(57) ABSTRACT

A rotating module includes a fixing member, a rotating member rotatably mounted on the fixing member, a swinging arm and a first elastic member. The swinging arm includes a first end and a second end. The first end is hinged to the rotating member, the second end is slidably and rotatably mounted to the fixing member. The first elastic member is fastened between the fixing member and the second end, the rotating member is rotated relative to the fixing member to drive the second end to slide on the fixing member to compress or release the first elastic member.

13 Claims, 6 Drawing Sheets

ROTATING MODULE AND ELECTRONIC DEVICE USING SAME

BACKGROUND

1. Technical Field

The disclosure generally relates to rotating modules for electronic devices and electronic devices using the rotating module.

2. Description of the Related Art

An electronic device such as a mobile phone may include a housing, a cover and a rotating module rotatably connecting the housing to the cover. The housing and the cover may define limiting portions such as limiting posts for maintaining the cover to be opened relative to the housing. However, the rotation of the rotating module may impact a force on the housing causing damage to the limiting posts and the cover.

Therefore, there is room for improvement within the art.

BRIEF DESCRIPTION OF THE DRAWINGS

Many aspects of the exemplary rotating module and electronic device using same can be better understood with reference to the following drawings. The components in the various drawings are not necessarily drawn to scale, the emphasis instead being placed upon clearly illustrating the principles of the exemplary rotating module and electronic device using same. Moreover, in the drawings, like reference numerals designate corresponding parts throughout the diagrams.

DETAILED DESCRIPTION

Figure 1:
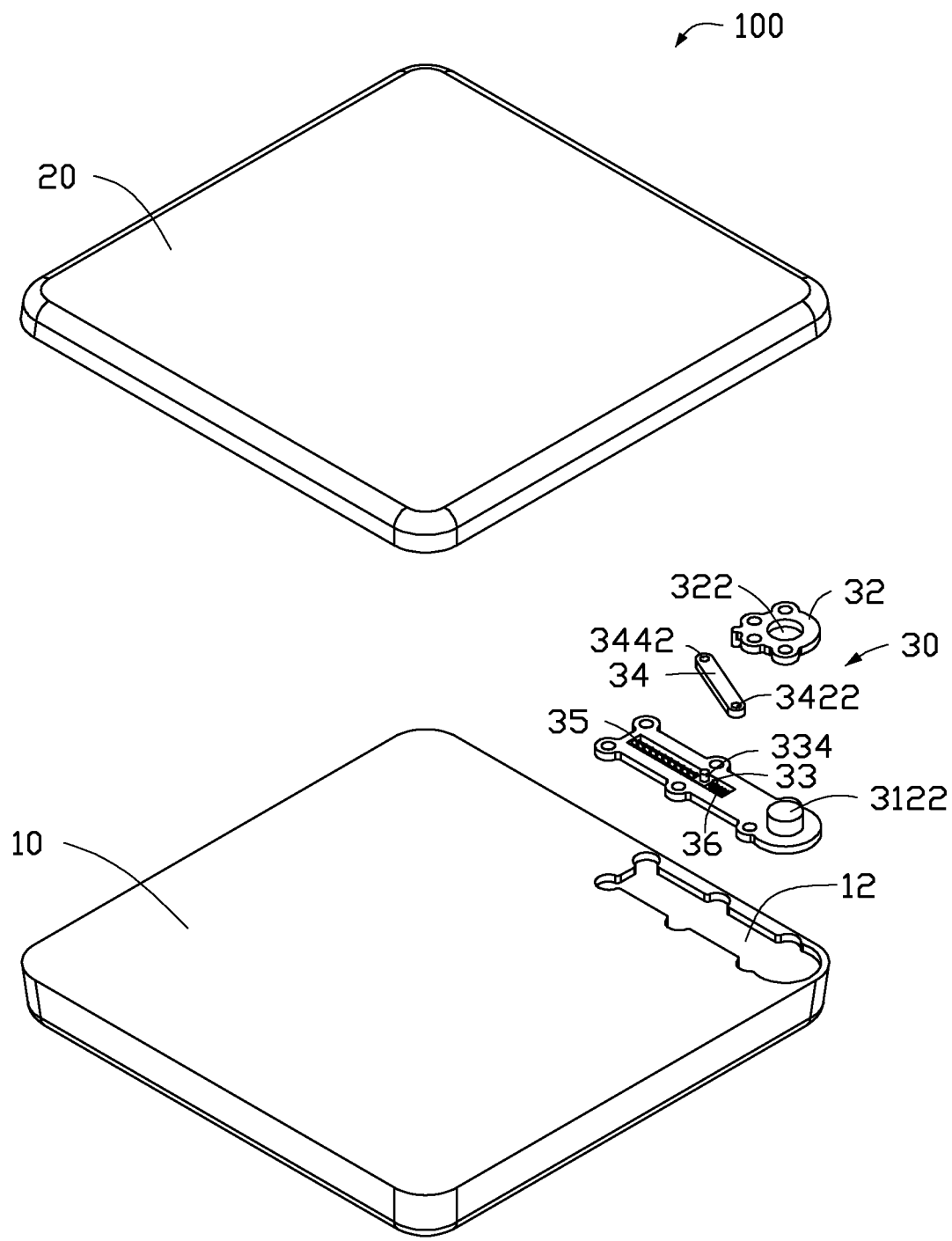
FIG. 1 is an exploded view of the electronic device using the rotating module according to an exemplary embodiment.
Figure 2:
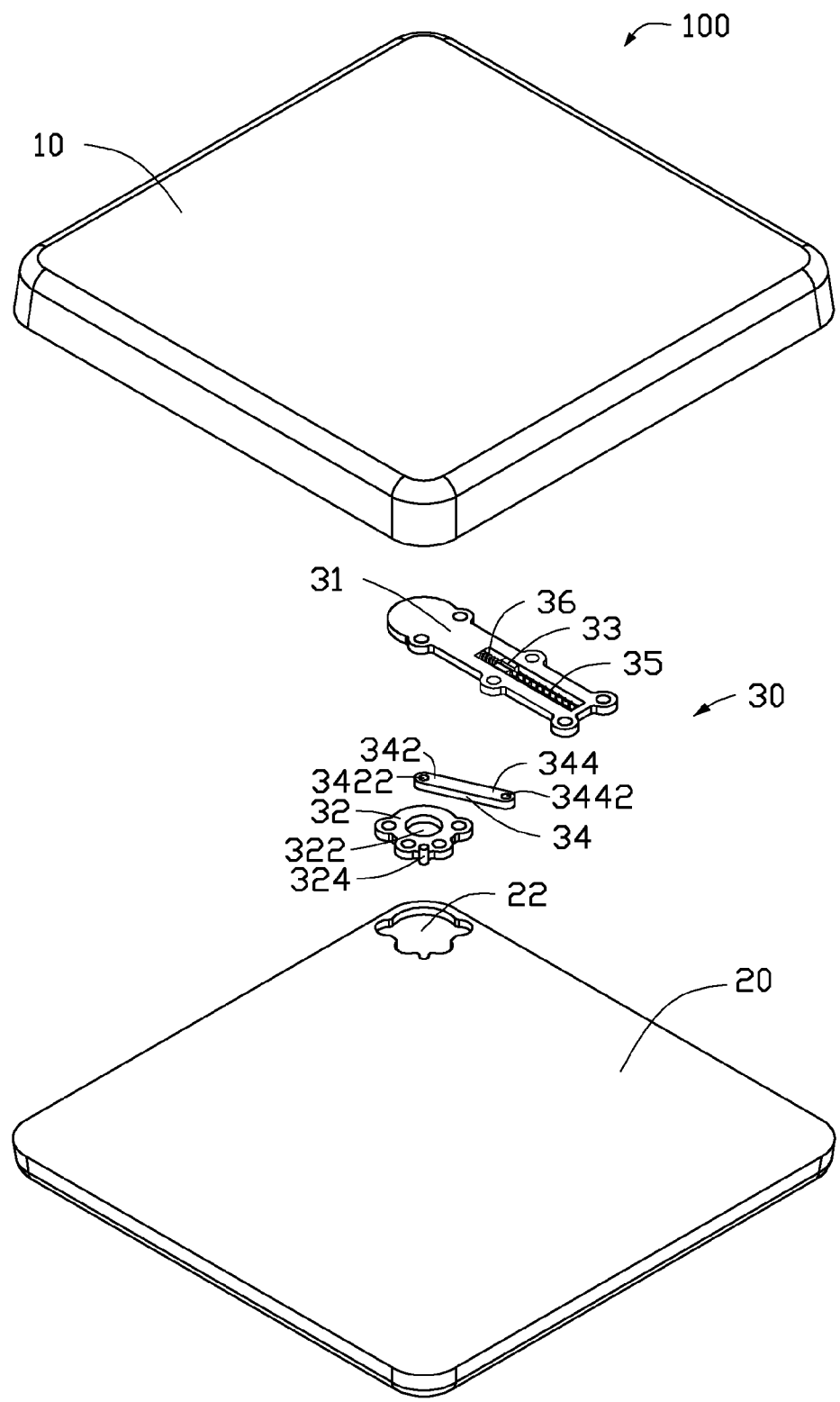
FIG. 2 is another exploded view of the electronic device using the rotating module shown in FIG. 1.

FIGS. 1 and 2 show an exemplary electronic device 100 including a housing 10, a cover 20 and a rotating module 30 rotatably connecting the housing 10 and the cover 20. The housing 10 defines a fixing slot 12. The cover 20 defines a fastening slot 22. Both the fixing slot 12 and the fastening slot 22 are used to mount the rotating module 30.

Figure 3:
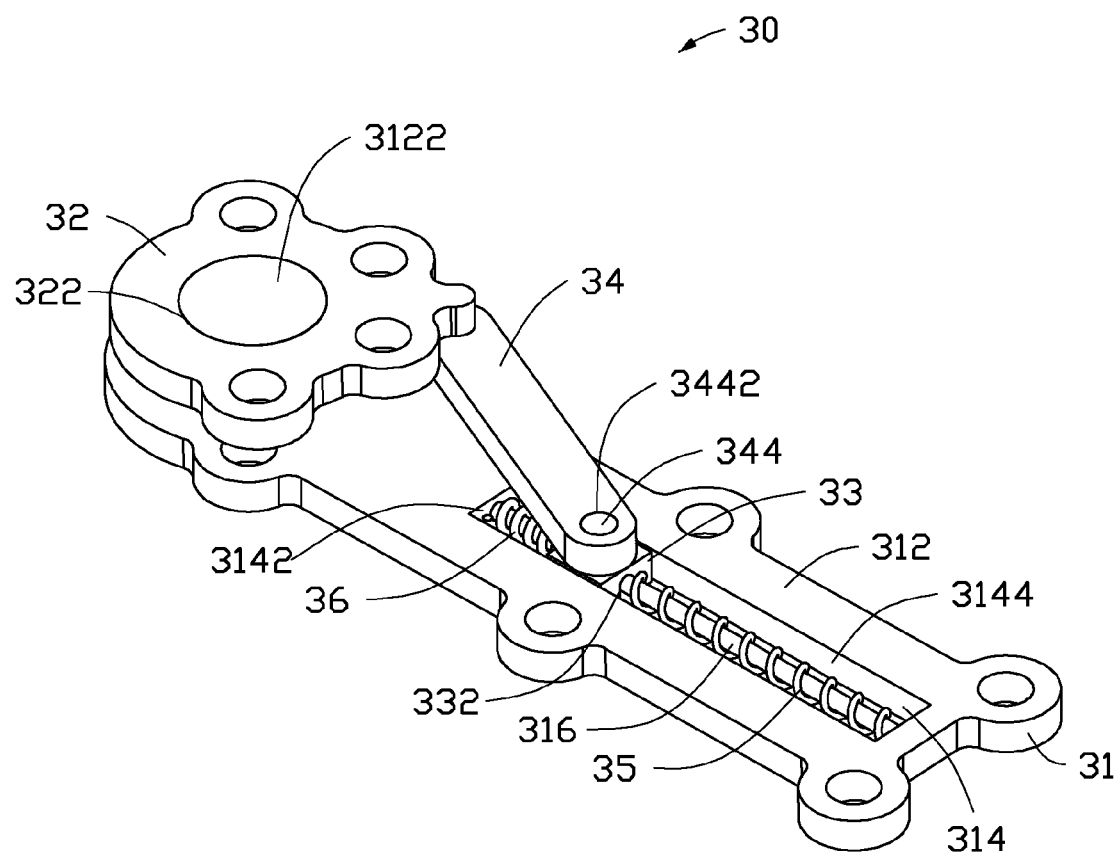
FIG. 3 is an isometric view of the rotating module shown in FIG. 1.

FIG. 3, shows the rotating module 30 including a fixing member 31, a rotating member 32 rotatably mounted on the fixing member 31, a sliding member 33 slidably mounted on the fixing member 31, a swinging arm 34 connecting the rotating member 32 and the sliding member 33, a first elastic member 35 and a second elastic member 36. The sliding member 33 is clamped between the first elastic member 35 and the second elastic member 36.

The fixing member 31 includes two opposite surfaces 312. The fixing member 31 has a shaft 3122 projecting from one of the two surfaces 312. The rotating member 32 is rotatably mounted on the fixing member 31 via the shaft 3122. The fixing member 31 defines a sliding groove 314 for retaining the sliding member 33. The sliding groove 314 is formed by two opposite end walls 3142 and two opposite side walls 3144. The fixing member 31 defines a guide pole 316 connecting the end walls 3142. The sliding member 33, the first elastic member 35 and the second elastic member 36 are mounted on the guide pole 316, and the sliding member 33 resists between the first elastic member 35 and the second elastic member 36.

The rotating member 32 defines a rotating hole 322 and a first hinge pin 324. The shaft 3122 is mounted in the rotating hole 322. The first hinge pin 324 is hinged to one end of the swinging arm 34.

The sliding member 33 defines a through hole 332 and a second hinge pin 334. The through hole 332 mounts the guide pole 316. The second hinge pin 334 is hinged to the opposite end of the swinging arm 34.

Figure 4:
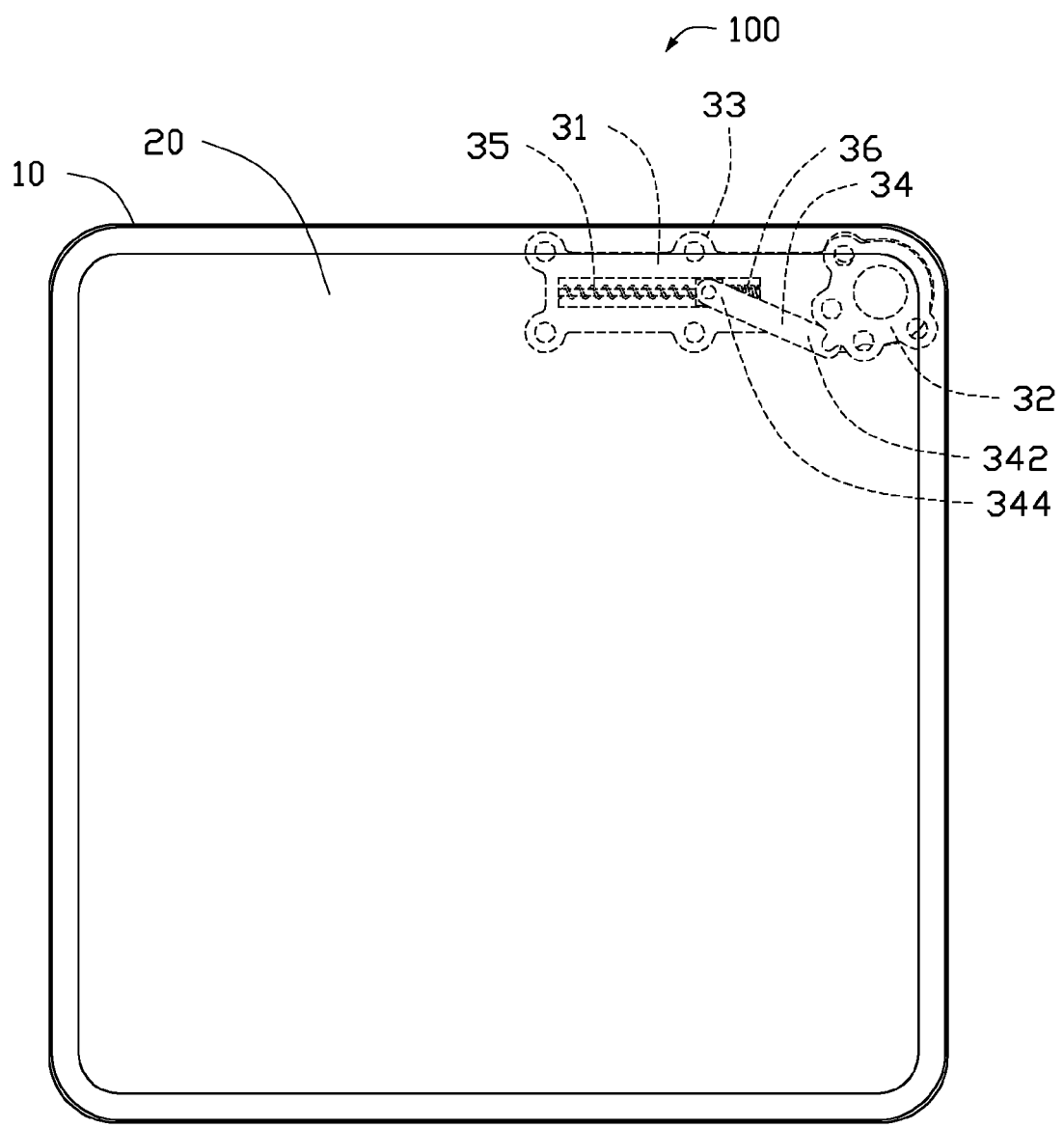
FIG. 4 is an isometric view of the electronic device shown in FIG. 1.

FIG. 4, shows the swinging arm 34 including a first end portion 342 and a second end portion 344. The first end portion 342 defines a first hinge hole 3422 for mounting the first hinge pin 324. The second end portion 344 defines a second hinge hole 3442 for mounting the second hinge pin 334.

FIG. 4, is during assembly, the first elastic member 35, the sliding member 33 and the second elastic member 36 are placed around the guide pole 316 in order. Each end of the guide pole 316 is fixed onto a corresponding end wall 3142. At this time, the sliding member 33 is clamped between the first elastic member 35 and the second elastic member 36. The second end 344 of the swing arm 34 is hinged to the second hinge pin 334 with the second hinge hole 3442. The rotating member 32 is rotatably mounted onto the shaft 3122 when the first hinge pin 324 is opposite to the first hinge hole 3422 of the swinging arm 34. Therefore, the first hinge pin 324 is mounted in the first hinge hole 3422. The fixing member 31 is fixed into the fixing slot 12 of the housing 10. The rotating member 32 is fastened into the fastening slot 22. The electronic device 100 is assembled and the cover 20 is covering the housing 10.

Figure 5:
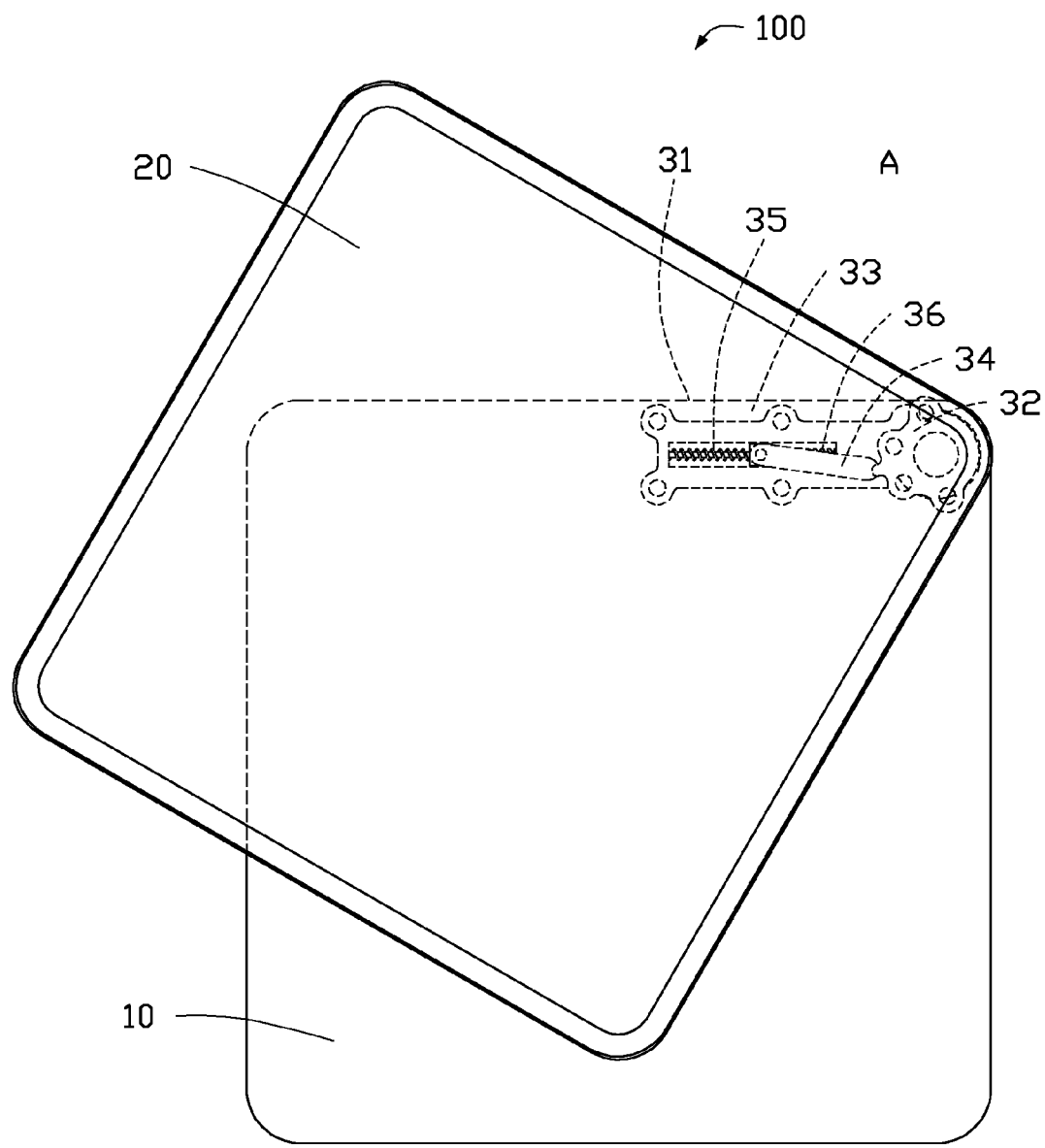
FIGS. 5 and 6 are similar to FIG. 1, showing the electronic device in use.
Figure 6:
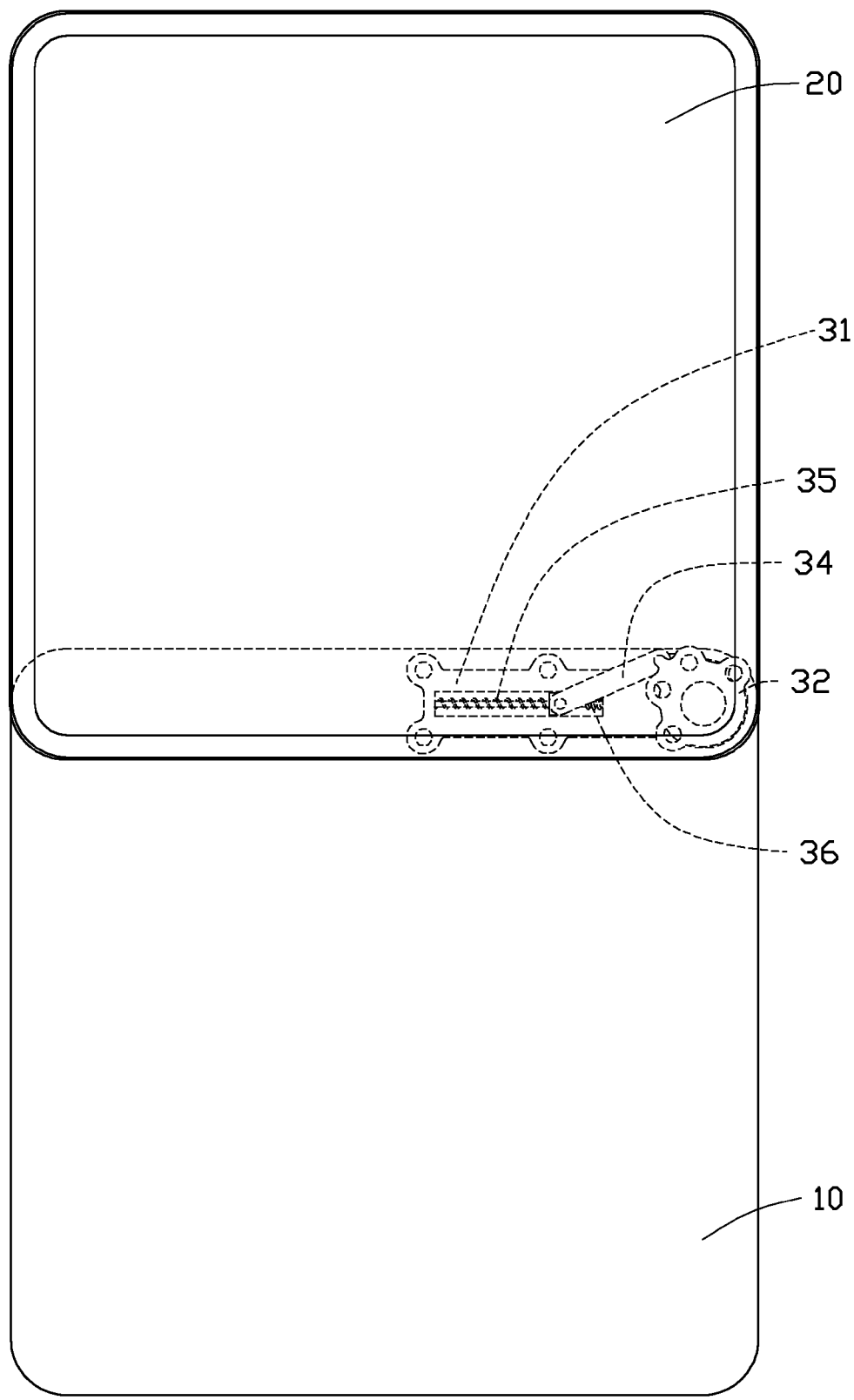

FIG. 5 and FIG. 6, show in use, an external force being applied on the cover 20, driving the cover 20 to rotate relative to the housing 10. The first end 342 of the swinging member 34 is rotated around the first hinge pin 324, and the second end 344 is rotated around the second hinge pin 334 at the same time. The second end 344 compresses the first elastic member 35 to accumulate an elastic force. The elastic force is at maximum when the swinging arm 34 is moved to be a predetermined position labeled with an "A" shown in FIG. 5. The elastic force is released to drive the cover 20 to rotate further when the swinging arm 34 has been moved over the predetermined position A, until the cover 20 is completely opened relative to the housing 10. When the cover 20 is rotated to be completely opened, the second elastic member 36 is compressed with the sliding member 33, producing a buffering force to prevent the housing 10 from impacting the cover 20.

The process of closing the electronic device 100 is reversed to the opening process. When the cover 20 approaches to being completely closed, the first elastic member 35 is compressed with the sliding member 33, producing a buffering force to prevent the housing 10 from impacting the cover 20.

It is to be understood, however, that even through numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A rotating module, comprising:
a fixing member defining a sliding groove;

a sliding member slidably mounted in the sliding groove the fixing member;

a rotating member rotatably mounted on the fixing member;

a swinging arm comprising a first end and a second end, the first end hinged to the rotating member, the second end rotatably mounted to the sliding member;

a first elastic member received in the sliding groove and fastened between the fixing member and the sliding member; and a second elastic member received in the sliding groove of the fixing member, the first elastic member and the second elastic member positioned at opposite sides of the sliding member, the sliding member resisted between the first elastic member and the second elastic member;

wherein the rotating member is capable of rotating relative to the fixing member to drive the second end to slide the sliding member along the sliding groove of the fixing member to compress or release the first elastic member.

2. The rotating module as claimed in claim 1, wherein the sliding groove is formed by two side walls and two end walls, the first elastic member is fastened between one of the two end walls and the sliding member.

3. The rotating module as claimed in claim 2, wherein the rotating module further comprises a guide pole connecting the end walls, the sliding member and the first elastic member are mounted around and slidable on the guide pole.

4. The rotating module as claimed in claim 1, wherein the rotating member defines a rotating hole, the fixing member defines a shaft rotatably mounted in the rotating hole.

5. The rotating module as claimed in claim 1, wherein the first end defines a first hinge hole, the rotating member further defines a first hinge pin pivotably mounted in the first hinge hole.

6. The rotating module as claimed in claim 5, wherein the second end defines a second hinge hole, the sliding member further defines a second hinge pin pivotably mounted in the second hinge hole.

7. An electronic device, comprising:
a housing;
a cover;
a rotating module rotatably connecting the housing and the cover comprising:

a fixing member fixed on the housing, the fixing member defining a sliding groove;

a sliding member slidably mounted in the sliding groove the fixing member;

a rotating member mounted on the cover and rotatably mounted on the fixing member;

a swinging arm comprising a first end and a second end, the first end hinged to the rotating member, the second end rotatably mounted to the sliding member; and a first elastic member received in the sliding groove and fastened between the fixing member and the sliding member;

wherein the rotating member is capable of rotating relative to the fixing member to drive the second end to slide the sliding member along the sliding groove of the fixing member to compress or release the first elastic member.

8. The electronic device as claimed in claim 7, wherein the sliding groove is formed by two side walls and two end walls, the first elastic member is fastened between one of the two end walls and the sliding member.

9. The electronic device as claimed in claim 8, wherein the rotating module further comprises a guide pole connecting the end walls, the sliding member and the first elastic member are mounted around and slidable on the guide pole.

10. The electronic device as claimed in claim 7, wherein the rotating module further comprises a second elastic member, the second elastic member is received in the sliding groove of the fixing member, the first elastic member and the second elastic member are positioned at opposite sides of the sliding member, the sliding member is resisted between the first elastic member and the second elastic member.

11. The electronic device as claimed in claim 7, wherein the rotating member defines a rotating hole, the fixing member defines a shaft rotatably mounted in the rotating hole.

12. The electronic device as claimed in claim 7, wherein the first end defines a first hinge hole, the rotating member further defines a first hinge pin pivotably mounted in the first hinge hole.

13. The electronic device as claimed in claim 12, wherein the second end defines a second hinge hole, the sliding member further defines a second hinge pin pivotably mounted in the second hinge hole.

* * * * *